(12) United States Patent
Sevov et al.

(10) Patent No.: US 12,116,427 B2
(45) Date of Patent: Oct. 15, 2024

(54) MODIFIED POLYVINYLCHLORIDES AND CHLOROPARRAFINS

(71) Applicant: OHIO STATE INNOVATION FOUNDATION, Columbus, OH (US)

(72) Inventors: Christo Sevov, Columbus, OH (US); Blaise Truesdell, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 49 days.

(21) Appl. No.: 17/902,091

(22) Filed: Sep. 2, 2022

(65) Prior Publication Data

US 2023/0133245 A1    May 4, 2023

Related U.S. Application Data

(60) Provisional application No. 63/275,492, filed on Nov. 4, 2021.

(51) Int. Cl.
*C08F 114/06*     (2006.01)
*C08F 8/00*     (2006.01)

(52) U.S. Cl.
CPC .............. *C08F 114/06* (2013.01); *C08F 8/00* (2013.01)

(58) Field of Classification Search
CPC ........ C08F 114/06; C08F 8/04; C08F 214/06; C08F 210/02; C08F 2500/15; C08F 2500/16
See application file for complete search history.

(56) References Cited

PUBLICATIONS

Braun, Die Angewandte Makromoleulare Chemie 141 (1986) 113-129. (Year: 1986).*
Wu, Macromolecules, vol. 6, No. 5, 1973, p. 737-741 (Year: 1973).*
Schilling, Macromolecules, 1985, 18, p. 356-360 (Year: 1985).*
Schaeffer, Journal of Physical Chemistry, vol. 70, No. 6, Jun. 1966, p. 1975-1988 (Year: 1966).*
Pourahmady, Journal of Macromolecular Science, Part A: Pure and Applied Chemistry, A29(11), p. 959-974 (1992) (Year: 1992).*
Mark, Polymer, 1973, vol. 14, p. 553-557 (Year: 1973).*
Knettle, Brian W., and Robert A. Flowers. "Influence of HMPA on reducing power and reactivity of SmBr2." Organic Letters 3.15 (2001): 2321-2324.

* cited by examiner

*Primary Examiner* — Robert C Boyle
(74) *Attorney, Agent, or Firm* — Meunier Carlin & Curfman LLC (57) ABSTRACT

Disclosed herein are modified polyvinyl chloride polymers and oligomers, and methods of making the same. The modified polymers can be obtained via electrochemical reduction of polyvinyl chloride polymers. In some instances the modified polyvinyl chloride polymer is a crosslinked polymer, and in some instances the modified polyvinyl chloride polymer is a block copolymer. Disclosed herein are methods for selectively introducing various functional groups into a polyvinyl chloride polymer.

12 Claims, 4 Drawing Sheets

MODIFIED POLYVINYLCHLORIDES AND CHLOROPARRAFINS

CROSS-REFERENCE TO RELATED APPLICATION

This application claims the benefit of U.S. Provisional Application 63/275,492, filed on Nov. 4, 2021, the contents of which are hereby incorporated in its entirety.

ACKNOWLEDGEMENT OF GOVERNMENT SUPPORT

This invention was made with government support under grant number DE-SC0021961 awarded by the Department of Energy Basic Energy Sciences. The government has certain rights in the invention.

FIELD OF THE INVENTION

The invention is directed to compositions, systems and methods for selectively modifying polymers, including polyvinyl polymers. The invention is also directed to improved polyvinyl chloride copolymers.

BACKGROUND

Polyvinylchloride is the third-largest commodity plastic consumed globally, following only polyethylene (PE) and polypropylene (PP). Because of their robust properties, PVC plastics have been implemented in thousands of applications including outdoor siding, flooring, plumbing, wiring, and medical packaging. Despite the wide range of applications as both a rigid and flexible plastic, pure PVC has a surprisingly narrow range of macromolecular properties. Many of these properties, including brittleness, thermal instability, and poor shear strength, are undesirable and cannot be modified through reaction design because PVC is prepared by free-radical polymerization. This lack of molecular control over PVC formation—and, therefore, lack of macromolecular control—is in stark contrast to the many distinct forms of PE or PP that can be synthesized by simply modifying the structures of complexes that catalyze ethylene or propylene polymerization.

Altering the physical properties of PVC relies on high loadings (up to 50%) of plasticizers, stabilizers, and impact modifiers. Prior to the discovery of PVC plasticization in 1926, PVC had been a known but unusable material for nearly a century. Unlike hydrophobic PE or PP polyolefins, PVC is highly polarized because of its C—Cl bonds and can interact with additives to form homogeneously-dispersed materials even with high additive loadings. However, these formulations pose significant drawbacks to both recycling and environmental safety. For one, PVCs containing different plasticizers cannot be recycled together. Efforts to convert PVC plastics into closed-loop systems by extracting the plasticizers and recovering the pure PVC resin for reuse have failed, resulting in the closure of companies like VinylLoop. In addition, plasticizers are non-covalent additives that can leach or "bloom" from PVC plastics. The continuous loss of the plasticizing additives as the material ages poses significant environmental hazard. First, the integrity of the plastic is compromised, causing the material to exhibit the undesirable properties of pure PVC. The aged materials deteriorate and shed harmful microplastics. Second, the organic additives themselves are harmful and many are banned from use in food or medical supplies by the FDA.

Third, continuous loss of key additives from PVC plastics limits the lifetime and recyclability of the material. End-of-life disposal of these aged PVCs is equally problematic. Unlike conventional polyolefins, PVCs do not cleanly burn because of the high chloride content. Rather, pyrolysis of PVC is extremely energy intensive and creates corrosive (HCl) and acutely-toxic (dioxin) products.

In addition to plasticizers, PVC formulations require stabilizing additives that further complicate reuse and recycling. Pure PVC resin is thermally unstable and rapidly degrades during processing at elevated temperatures because of site defects from irregular chain growth. Propagation errors are rare and form allylic and tertiary alkyl chlorides roughly once every 1000 units. However, the weak C—Cl bonds at these defect sites (60-70 kcal/mol) are susceptible to fragmentation and elimination to form an alkene and release HCl. The resulting alkenes weaken neighboring C—Cl bonds, which causes a cascade of elimination reactions along the polymer backbone, often referred to as a "zipper elimination". The conjugated polyene that results is discolored and undergoes uncontrolled secondary reactions such as chain crosslinking. To combat these degradation processes, heavy-metal stabilizers based on organotin complexes are non-covalently incorporated into the melt. During high-temperature fusion of the formulation, degradation products are captured by the stabilizer to prevent further decomposition. In addition to organotin stabilizers, organic additives like benzophenones, benzotriazoles, and hindered amines (HALS) are commonly incorporated in PVCs for flexible applications. However, these stabilizers are banned by the FDA from use in flexible PVCs for medical applications like IV and blood bags because of their toxicity. Flexible PVCs that serve critically-important storage needs for the medical community are stabilized by Ba, Zn, and Ca salts. These additives are nontoxic but are also less effective than Sn-based stabilizers. Consequently, PVCs with non-toxic stabilizers generally have even shorter recycle lifetimes than conventional PVC plastics because of greater decomposition during each reprocessing.

To address these limitations, new chemistries are needed that enable on-polymer bond functionalization of PVC to provide a means of controlling the physical properties of the resulting materials. The invention of such technologies would reduce or eliminate the reliance on non-covalent formulations for altering the properties of PVC. The invention directly address these limitations by developing reaction chemistries that selectively activate and functionalize C—Cl bonds under mild conditions to install functionality directly in the PVC backbone that can provide materials with the desired physical properties without the need for plasticizing additives, correct polymer defects to yield materials with longer lifetimes and greater recyclability than short and single-use PVCs, and form new materials that can be reversibly assembled into chloropolymers with unlimited recyclability.

The selective catalytic functionalization of inert C—Cl bonds remains a challenge in organic synthesis. However, the recent renaissance of electrosynthesis and its merger with metal-catalyzed organic synthesis now provides new strategies for selective functionalization of challenging bonds. Electrochemistry is inherently applicable to net-oxidative or reductive processes because reactions occur at either an anode (oxidative) or cathode (reductive). This fundamental aspect of electrosynthesis is critically important because functionalization of alkyl chlorides in PVC constitutes a reductive transformation, and no other technology can safely provide the reducing equivalents on the scale needed for PVC upcycling. For reductive processes, electrons can be sourced from low-energy electron donors at the anode, such as an iron rod or zinc plate, and delivered to an electrocatalyst at the cathode with the high energies that are required for reductive activation of the catalyst. The deficiency in energy between oxidation of the weak electron donor and high-energy reduction of the catalyst is supplemented by electrical energy. On-demand access to any reduction potential through electrochemistry expands the chemical space of catalysts that can be evaluated beyond the limits of chemical reductants. Additionally, programmable parameters such as current and reducing equivalents allow user control over catalyst turnover frequency and total turnovers, respectively, which can be used to control grafting densities of the polymer backbone. Overall, electrocatalysis uniquely provides a controllable, mild, and scalable approach for the net-reductive reactions that are required for C—Cl bond functionalization in PVC.

SUMMARY

In accordance with the purposes of the disclosed materials and methods, as embodied and broadly described herein, the disclosed subject matter, in one aspect, relates to compounds, compositions and methods of making and using compounds and compositions.

Disclosed herein are methods of modified polyvinyl chloride polymers, and modified polymers obtained therefrom.

Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

The details of one or more embodiments are set forth in the descriptions below. Other features, objects, and advantages will be apparent from the description and from the claims.

DETAILED DESCRIPTION

Figure 1:
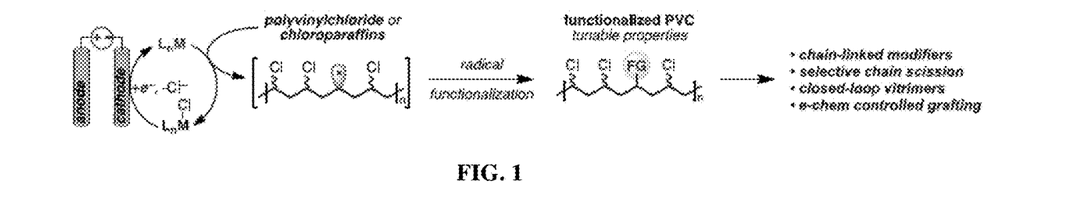
FIG. 1 depicts the electrocatalytic reductive functionalization of PVC.
Figure 2A:
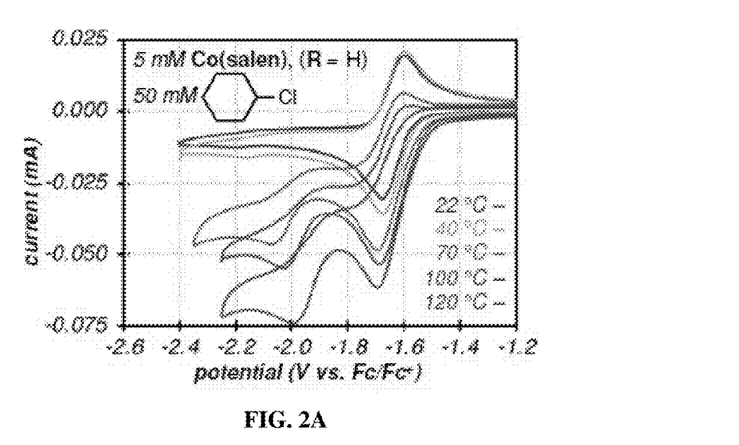
FIG. 2A depicts the reactivity of Co(salen) towards CyCl evaluated by CV (DMF, 100 mM $KPF_6$, 100 mV/s).
Figure 2B:
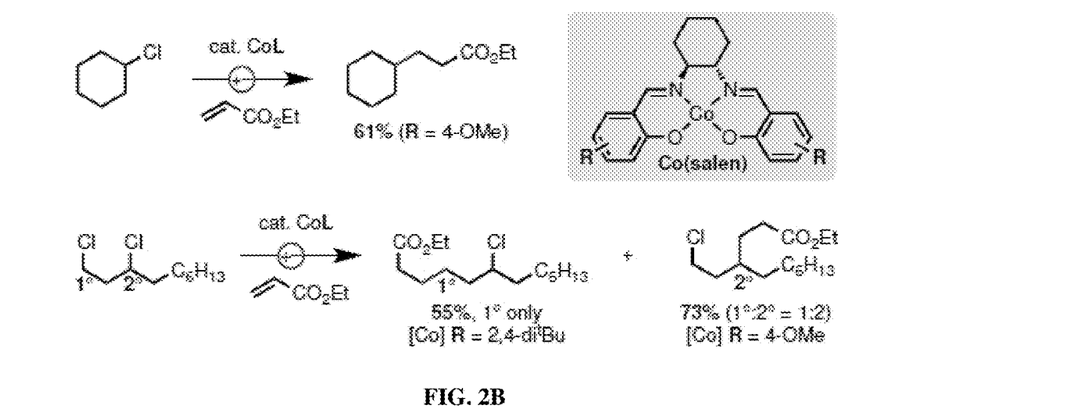
FIG. 2B depicts electrocatalytic functionalization reactions of alkyl chlorides.
Figure 3:
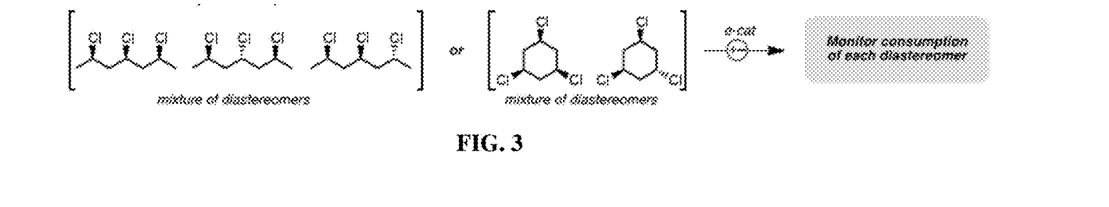
FIG. 3 depicts an illustration of complementary mechanisms for C—Cl activation and resulting selectivities.
Figure 4:
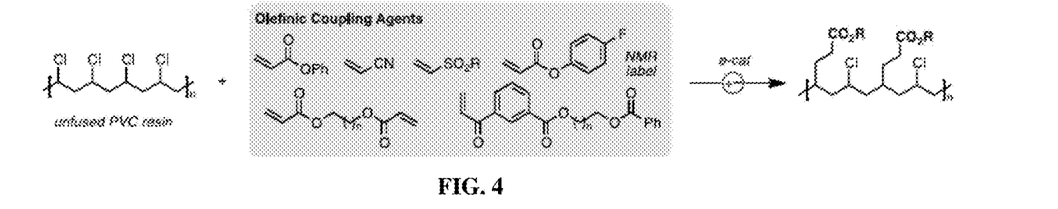
FIG. 4 depicts PVC modification with olefinic substrates
Figure 5:
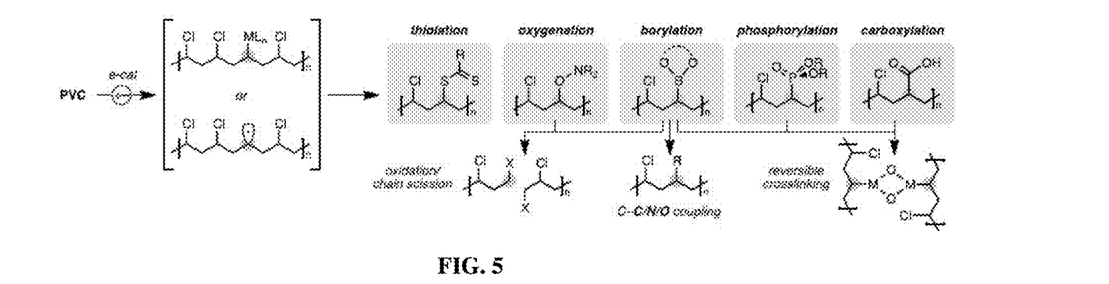
FIG. 5 depicts electroreductive functionalization of PVC.
Figure 6:
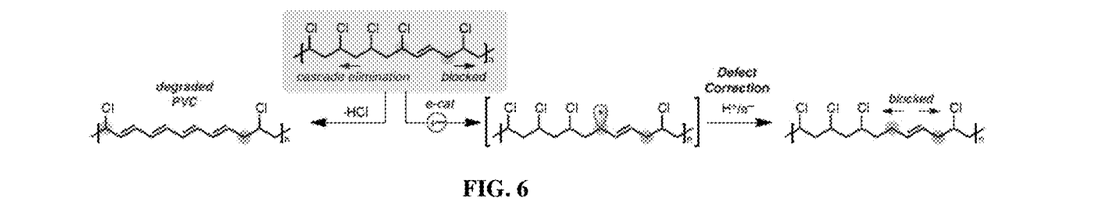
FIG. 6 depicts cascading eliminations of allylic chlorides and a method to block elimination by electrocatalytic reduction.
Figure 7:
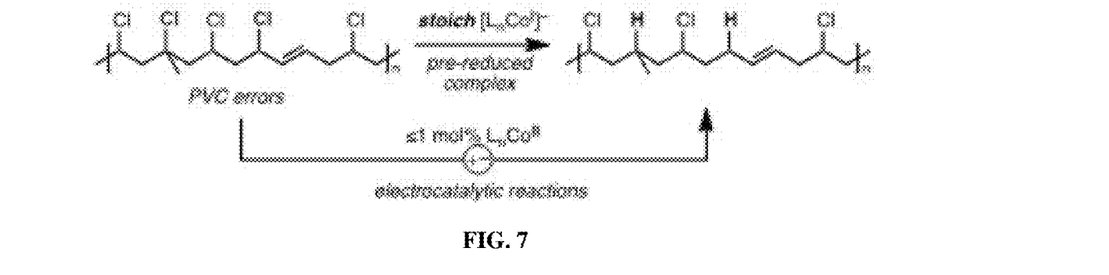
FIG. 7 depicts PVC defect correction
Figure 8A:
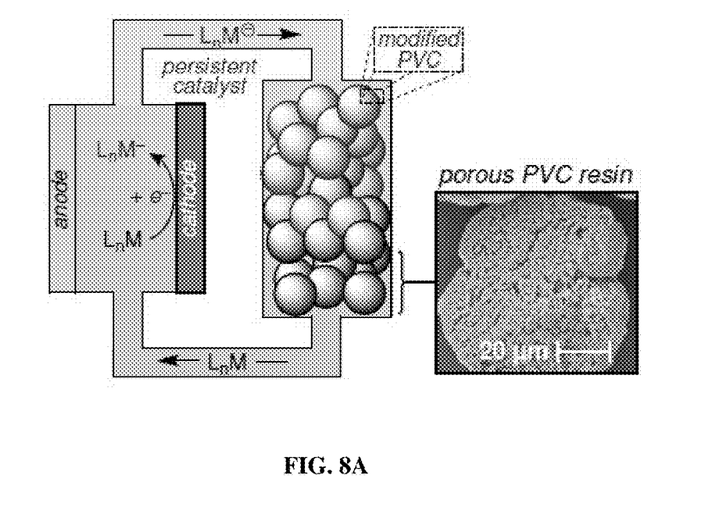
FIG. 8A depicts electrocatalytic modification of solid PVC resin in flow reactor.
Figure 8B:
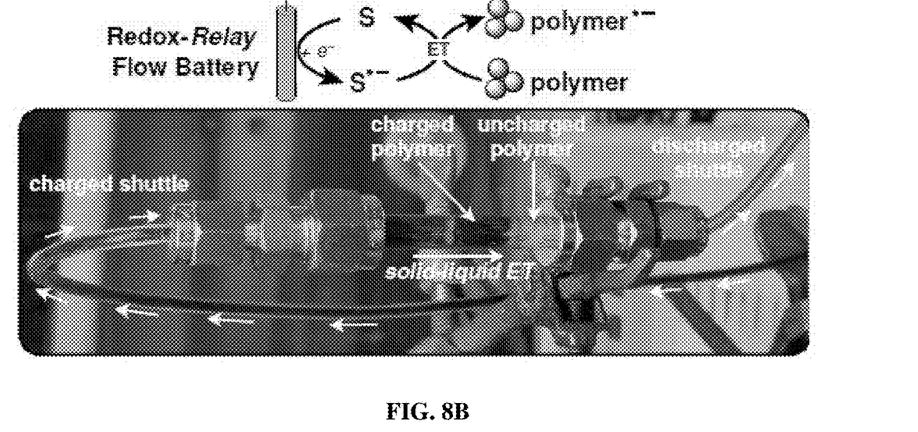
FIG. 8B depicts solution-relayed ET to a solid-state polymer for energy storage.
Figure 9:
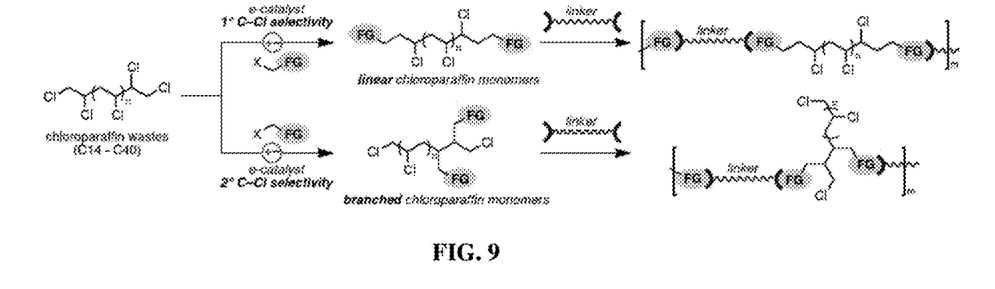
FIG. 9 depicts electrocatalytic chloroparaffin modification and assembly of vitrimers.
Figure 10:
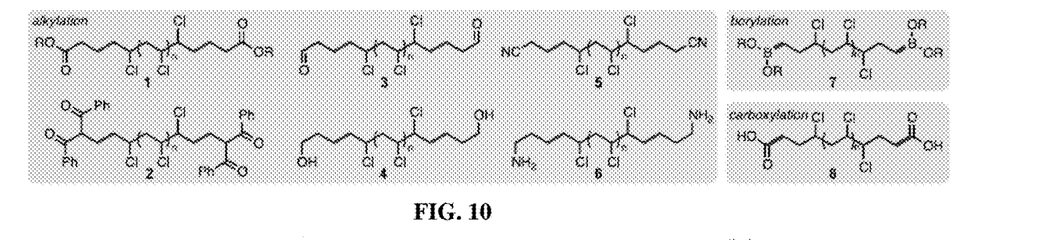
FIG. 10 depicts monomers from electrocatalytic functionalization of chloroparaffins.
Figure 11:
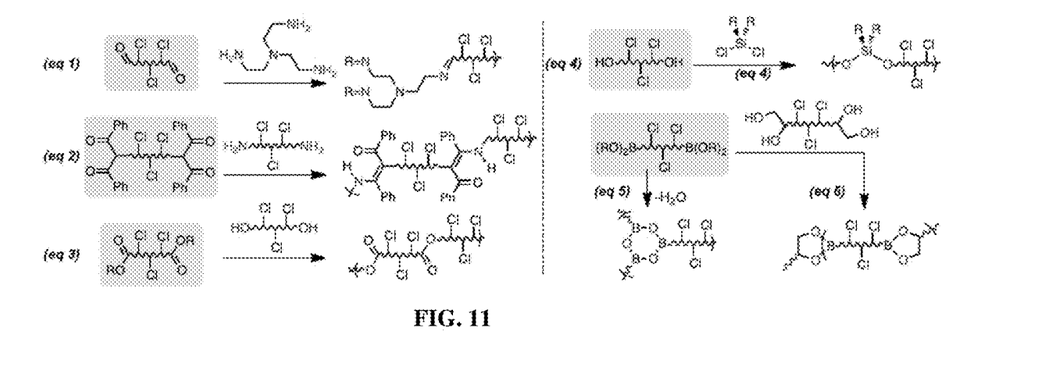
FIG. 11 depicts crosslinking reactions with modified PVC vitrimers.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes¬ from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

Unless stated to the contrary, a formula with chemical bonds shown only as solid lines and not as wedges or dashed lines contemplates each possible isomer, e.g., each enantiomer, diastereomer, and meso compound, and a mixture of isomers, such as a racemic or scalemic mixture. Unless stated to the contrary, a formula depicting one or more stereochemical features does not exclude the presence of other isomers.

Throughout the definitions, the term "$C_n$-$C_m$" indicates a range that includes the endpoints, wherein n and m are integers and indicate the number of carbons. Examples include, without limitation, $C_1$-$C_4$, $C_1$-$C_6$, and the like.

The term "alkyl" as used herein is a branched or unbranched hydrocarbon group such as methyl, ethyl, n-propyl, isopropyl, n-butyl, isobutyl, t-butyl, pentyl, hexyl, heptyl, octyl, nonyl, decyl, dodecyl, and the like. In various aspects, the alkyl group contains from 1 to 24 carbon atoms ($C_1$-$C_{24}$), from 1 to 12 carbon atoms ($C_1$-$C_{12}$), from 1 to 10 carbon atoms ($C_1$-$C_{10}$), from 1 to 8 carbon atoms ($C_1$-$C_8$), from 1 to 6 carbon atoms ($C_1$-$C_6$), from 1 to 4 carbon atoms ($C_1$-$C_4$), from 1 to 3 carbon atoms ($C_1$-$C_3$), or 1 to 2 carbon atoms ($C_1$-$C_2$). The alkyl group can also be substituted or unsubstituted. Unless stated otherwise, the term "alkyl" contemplates both substituted and unsubstituted alkyl groups. The alkyl group can be substituted with one or more groups including, but not limited to, $C_1$-$C_{10}$alkoxy, $C_1$-$C_{10}$alkenyl, $C_1$-$C_{10}$alkynyl, $C_3$-$C_{10}$cycloalkyl, $C_1$-$C_{10}$heterocycloalkyl, $C_6$-$C_{18}$aryl, $C_1$-$C_{10}$heteroaryl, aldehyde, amino, carboxylic acid, oxo, halide, hydroxy, cyano, nitro, silyl, sulfo-oxo, or thiol. An alkyl group which contains no double or triple carbon-carbon bonds is designated a saturated alkyl group, whereas an alkyl group having one or more such bonds is designated an unsaturated alkyl group. Unsaturated alkyl groups having a double bond can be designated alkenyl groups, and unsaturated alkyl groups having a triple bond can be designated alkynyl groups.

"Alkylene" or "alkylene chain" refers to a fully saturated, straight or branched divalent hydrocarbon chain radical, having from one to forty carbon atoms, e.g., $C_{1-40}$alkylene, $C_{1-20}$alkylene, $C_{1-10}$alkylene, $C_{1-5}$alkylene, $C_{2-10}$ alkylene, and the like. Unless stated otherwise specifically in the specification, an alkylene chain can be optionally substituted. Similarly, "alkenylene" or "alkenylene chain" refers to a straight or branched divalent hydrocarbon chain radical, having from two to forty carbon atoms, and having one or more carbon-carbon double bonds, and "alkynylene" or "alkynylene chain" refers to a straight or branched divalent hydrocarbon chain radical, having from two to forty carbon atoms, and having one or more carbon-carbon triple bonds.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is replaced with a heteroatom such as, but not limited to, nitrogen, oxygen, sulfur, selenium or phosphorus. The cycloalkyl group and heterocycloalkyl group can be substituted or unsubstituted. Unless stated otherwise, the terms "cycloalkyl" and "heterocycloalkyl" contemplate both substituted and unsubstituted cyloalkyl and heterocycloalkyl groups. The cycloalkyl group and heterocycloalkyl group can be substituted with one or more groups including, but not limited to, $C_1$-$C_{10}$alkyl, $C_1$-$C_{10}$alkoxy, $C_1$-$C_{10}$alkenyl, $C_1$-$C_{10}$alkynyl, $C_3$-$C_{10}$cycloalkyl, $C_1$-$C_{10}$heterocycloalkyl, $C_6$-$C_{18}$aryl, $C_1$-$C_{10}$heteroaryl, aldehyde, amino, carboxylic acid, halide, hydroxy, cyano, oxo, nitro, silyl, sulfo-oxo, or thiol. A cycloalkyl group which contains no double or triple carbon-carbon bonds is designated a saturated cycloalkyl group, whereas an cycloalkyl group having one or more such bonds (yet is still not aromatic) is designated an unsaturated cycloalkyl group.

The term "aryl" as used herein is an aromatic ring composed of carbon atoms. Examples of aryl groups include, but are not limited to, phenyl and naphthyl, etc. The term "heteroaryl" is an aryl group as defined above where at least one of the carbon atoms of the ring is replaced with a heteroatom such as, but not limited to, nitrogen, oxygen, sulfur, selenium or phosphorus. The aryl group and heteroaryl group can be substituted or unsubstituted. Unless stated otherwise, the terms "aryl" and "heteroaryl" contemplate both substituted and unsubstituted aryl and heteroaryl groups. The aryl group and heteroaryl group can be substituted with one or more groups including, but not limited to, $C_1$-$C_{10}$alkyl, $C_1$-$C_{10}$alkoxy, $C_1$-$C_{10}$alkenyl, $C_1$-$C_{10}$alkynyl, $C_3$-$C_{10}$cycloalkyl, $C_1$-$C_{10}$heterocycloalkyl, $C_6$-$C_{18}$aryl, $C_1$-$C_{10}$heteroaryl, aldehyde, amino, carboxylic acid, halide, hydroxy, cyano, oxo, nitro, silyl, sulfo-oxo, or thiol.

Exemplary heteroaryl and heterocyclyl rings include: benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH carbazolyl, carbolinyl, chromanyl, chromenyL cirrnolinyl, decahydroquinolinyl, 2H,6H~1,5,2-dithiazinyl, dihydrofuro[2,3 b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl, and xanthenyl.

The terms "alkoxy," "cycloalkoxy," "heterocycloalkoxy," "cycloalkoxy," "aryloxy," and "heteroaryloxy" have the aforementioned meanings for alkyl, cycloalkyl, heterocycloalkyl, aryl and heteroaryl, further providing said group is connected via an oxygen atom. For example, "alkoxy" refers to the group —OR, where R is alkyl, alkenyl, alkynyl, cycloalkyl, or heterocyclyl as defined herein. Unless stated otherwise specifically in the specification, alkoxy can be optionally substituted.

"Alkylcarbamoyl" refers to the group —O—C(O)—$NR_aR_b$, where $R_a$ and $R_b$ are the same or different and independently an alkyl, alkenyl, alkynyl, aryl, heteroaryl, cycloalkyl, or heterocyclyl group, as defined herein, or $R_aR_b$ can be taken together to form a heterocyclyl group, as defined herein. Unless stated otherwise specifically in the specification, alkylcarbamoyl can be optionally substituted.

"Alkylcarboxamidyl" refers to the group —C(O)—$NR_aR_b$, where $R_a$ and $R_b$ are the same or different and independently an alkyl, alkenyl, alkynyl, aryl, heteroaryl, cycloalkyl, cycloalkenyl, cycloalkynyl, or heterocyclyl group, as defined herein, or $R_aR_b$ can be taken together to form a cycloalkyl group, as defined herein. Unless stated otherwise specifically in the specification, alkylcarboxamidyl can be optionally substituted.

"Alkoxycarbonyl" refers to the group —C(O)OR, where R is alkyl, alkenyl, alkynyl, aryl, heteroaryl, cycloalkyl, cycloalkenyl, cycloalkynyl, or heterocyclyl group, as defined herein. Unless stated otherwise specifically in the specification, alkoxycarbonyl can be optionally substituted.

"Alkylthio" refers to the —SR or —S(O)$_{n=1-2}$—R, where R is alkyl, alkenyl, alkynyl, cycloalkyl, cycloalkenyl, cycloalkynyl, or hetereocyclyl, as defined herein. Unless stated otherwise specifically in the specification, alkylthio can be optionally substituted. "Arylthio" refers to the —SR or —S(O)$_{n=1-2}$—R, where R is aryl or hetereoaryl, as defined herein. Unless stated otherwise specifically in the specification, arylthio can be optionally substituted.

The term "substituted" used herein means any of the above groups (i.e., alkyl, alkenyl, alkynyl, cycloalkyl, cycloalkenyl, cycloalkynyl, heterocyclyl, aryl, heteroaryl, alkoxy, aryloxy, acyl, alkylcarbamoyl, alkylcarboxamidyl, alkoxycarbonyl, alkylthio, or arylthio) wherein at least one atom is replaced by a non-hydrogen atoms such as, but not limited to: a halogen atom such as F, Cl, Br, and I; an oxygen atom in groups such as hydroxyl groups, alkoxy groups, and ester groups; a sulfur atom in groups such as thiol groups, thioalkyl groups, sulfone groups, sulfonyl groups, and sulfoxide groups; a nitrogen atom in groups such as amines, amides, alkylamines, dialkylamines, arylamines, alkylarylamines, diarylamines, N-oxides, imides, and enamines; a silicon atom in groups such as trialkylsilyl groups, dialkylarylsilyl groups, alkyldiarylsilyl groups, and triarylsilyl groups; and other heteroatoms in various other groups. "Substituted" also means any of the above groups in which one or more atoms are replaced by a higher-order bond (e.g., a double- or triple-bond) to a heteroatom such as oxygen in oxo, carbonyl, carboxyl, and ester groups; and nitrogen in groups such as imines, oximes, hydrazones, and nitriles. For example, "substituted" includes any of the above groups in which one or more atoms are replaced with —NR$_g$R$_h$, —NR$_g$C(=O)R$_h$, —NR$_g$C(=O)NR$_g$R$_h$, —NR$_g$C(=O)OR$_h$, —NR$_g$SO$_2$R$_h$, —OC(=O)NR$_g$R$_h$, —OR$_g$, —SR$_g$, —SOR$_g$, —SO$_2$R$_g$, —OSO$_2$R$_g$, —SO$_2$OR$_g$, =NSO$_2$R$_g$, and —SO$_2$NR$_g$R$_h$. "Substituted also means any of the above groups in which one or more hydrogen atoms are replaced with —C(=O)R$_g$, —C(=O)OR$_g$, —C(=O)NR$_g$R$_h$, —CH$_2$SO$_2$R$_g$, —CH$_2$SO$_2$NR$_g$R$_h$. In the foregoing, R$_g$ and R$_h$ are the same or different and independently hydrogen, alkyl, alkenyl, alkynyl, alkoxy, alkylamino, thioalkyl, aryl, aralkyl, cycloalkyl, cycloalkenyl, cycloalkynyl, cycloalkylalkyl, haloalkyl, haloalkenyl, haloalkynyl, heterocyclyl, N-heterocyclyl, heterocyclylalkyl, heteroaryl, N-heteroaryl and/or heteroarylalkyl. "Substituted" further means any of the above groups in which one or more atoms are replaced by an amino, cyano, hydroxyl, imino, nitro, oxo, thioxo, halo, alkyl, alkenyl, alkynyl, alkoxy, alkylamino, thioalkyl, aryl, aralkyl, cycloalkyl, cycloalkenyl, cycloalkynyl, cycloalkylalkyl, haloalkyl, haloalkenyl, haloalkynyl, heterocyclyl, N-heterocyclyl, heterocyclylalkyl, heteroaryl, N-heteroaryl and/or heteroarylalkyl group. "Substituted" can also mean an amino acid in which one or more atoms on the side chain are replaced by alkyl, alkenyl, alkynyl, acyl, alkylcarboxamidyl, alkoxycarbonyl, carbocyclyl, heterocyclyl, aryl, or heteroaryl. In addition, each of the foregoing substituents can also be optionally substituted with one or more of the above substituents.

"A Michael acceptor" refers to an alkenyl or alkynyl group conjugated to an activating electrowithdrawing group, for instance a carbonyl, sulfonoyl, sulfinyl, cyano, or nitro.

As used herein, the term "null," when referring to a possible identity of a chemical moiety, indicates that the group is absent, and the two adjacent groups are directly bonded to one another. By way of example, for a genus of compounds having the formula CH$_3$—X—CH$_3$, if X is null, then the resulting compound has the formula CH$_3$—CH$_3$.

Unless stated to the contrary, a substituent drawn without explicitly specifying the point of attachment indicates that the substituent may be attached at any possible atom. For example, in a benzofuran depicted as:

the substituent may be bonded through any one of the six possible carbon atoms.

As used herein, the term "about" or "approximately" refers to a quantity, level, value, number, frequency, percentage, dimension, size, amount, weight or length that varies by acceptable levels in the art. In some embodiments, the amount of variation may be as much as 15 mol %, 10 mol %, 9 mol %, 8 mol %, 7 mol %, 6 mol %, 5 mol %, 4 mol %, 3 mol %, 2 mol % or 1 mol % to a reference quantity, level, value, number, frequency, percentage, dimension, size, amount, weight or length. In one embodiment, the term "about" or "approximately" refers a range of quantity, level, value, number, frequency, percentage, dimension, size, amount, weight or length±15 mol %, ±10 mol %, ±9 mol %, ±8 mol %, ±7 mol %, ±6 mol %, ±5 mol %, ±4 mol %, ±3 mol %, ±2 mol %, or ±1 mol % about a reference quantity, level, value, number, frequency, percentage, dimension, size, amount, weight or length.

A numerical range, e.g., 1 to 5, about 1 to 5, or about 1 to about 5, refers to each numerical value encompassed by the range. For example, in one non-limiting and merely illustrative embodiment, the range "1 to 5" is equivalent to the expression 1, 2, 3, 4, 5; or 1.0, 1.5, 2.0, 2.5, 3.0, 3.5, 4.0, 4.5, or 5.0; or 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0.

As used herein, the term "substantially" refers to a quantity, level, value, number, frequency, percentage, dimension, size, amount, weight or length that is 80 mol %, 85 mol %, 90 mol %, 91 mol %, 92 mol %, 93 mol %, 94 mol %, 95 mol %, 96 mol %, 97 mol %, 98 mol %, 99 mol % or higher compared to a reference quantity, level, value, number, frequency, percentage, dimension, size, amount, weight or length. In one embodiment, "substantially the same" refers to a quantity, level, value, number, frequency, percentage, dimension, size, amount, weight or length that produces an effect, e.g., a physiological effect, that is approximately the same as a reference quantity, level, value, number, frequency, percentage, dimension, size, amount, weight or length.

Disclosed herein are modified polyvinyl chlorides of Formula (I):

[Formula (1)]

wherein R is not a chlorine atom; 'a' is from 5-25,000; and 'b' is from 1-20,000. Unless specified to the contrary, the modified polyvinyl chlorides of Formula (I) are a random copolymer.

In certain embodiments, the ratio of 'a' units to 'b' units is from 10,000:1 to 1:1, from 7,500:1 to 1:1, from 5,000:1 to 1:1, from 2,500:1 to 1:1, from 1,000:1 to 1:1 from 500:1 to 1:1, from 250:1 to 1:1, from 100:1 to 1:1, from 50:1 to 1:1, from 25:1 to 1:1, from 10:1 to 1:1.

As used herein, "grafting density" refers to the ratio of modified chloride sites to unmodified chloride sites. The grafting density of the modified polyvinyl chloride can be at least 0.5%, at least 1%, at least 2%, at least 3%, at least 4%, at least 5%, at least 6%, at least 7%, at least 8%, at least 9%, at least 10%, at least 12.5%, at least 15%, at least 20%, at least 25%, at least 30%, at least 40%, or at least 50%. In some embodiments, the grafting density can be from 0.5-50%, from 1-50%, from 2.5-50%, from 5-50%, from 10-50%, from 15-50%, from 20-50%, from 25-50%, from 0.5-25%, from 0.5-15%, from 0.5-5%, from 1-10%, from 5-15%, from 10-25%, or from 25-50%.

Polyvinyl chloride systems can undergo dehydrohalogenation elimination reactions, generating allyl chloride units having the formula:

The modified polyvinyl chlorides of the present invention have reduced amounts of allyl chloride units. For example, the modified polyvinyl chloride can include allyl chloride units in an amount from 0-5%, 0-2.5%, from 0-1%, from 0-0.5%, from 0-0.25%, from 0-0.1%, from 0-0.05%, or from 0-0.01%, relative to the total number of 'a' and 'b' units.

The modified polyvinyl chlorides can have a number average molecular mass from 5,000-1,000,000, from 5,000-500,000, from 5,000-400,000, from 5,000-300,000, from 5,000-300,000, from 5,000-100,000, from 5,000-75,000, from 5,000-50,000, from 5,000-25,000, from 5,000-10,000, from 25,000-250,000, from 25,000-200,000, from 25,000-150,000, from 50,000-100,000, from 50,000-250,000, from 50,000-200,000, from 50,000-150,000, from 100,000-500,000, from 100,000-400,000, from 100,000-300,000, from 100,000-200,000, or from 150,000-250,000.

In some instances, the modified polyvinyl chlorides can include certain stereopentads. For a given system containing a units and b units as defined above, at least 10 mol. %, at least 20 mol. %, at least 30 mol. %, at least 40 mol. %, at least 50 mol. %, at least 60 mol. %, at least 70 mol. %, at least 80 mol. %, or least 90% of the b units can occur in pentads having the structure:

In some embodiments, at least 10 mol. %, at least 20 mol. %, at least 30 mol. %, at least 40 mol. %, at least 50 mol. %, at least 60 mol. %, at least 70 mol. %, at least 80 mol. %, or least 90% of the b units occur in pentads having the structure:

In certain embodiments, the modified polyvinyl chlorides can be characterized by the absence of certain pentads. For example, less than 50 mol %, less than 40 mol %, less than 30 mol %, less than 20 mol %, less than 10 mol %, or less than 5% mol. % of the b units occur in pentads having the structure:

Stereopentads can be quantitated using NMR spectroscopy. The modified polyvinyl chlorides can include a variety of different non-chlorine atoms in the b unit. For example, R can each case independently selected from H, F, Br, I, $NO_2$, CN, $N_3$, or a group having the formula:

$$-X^1-R^1,$$

wherein $X^1$ is null, $C_{1-8}$alkylene, $C_{6-18}$arylene, $C_{3-10}$cycloalkylene, $C_{1-10}$heterocycloalkylene, $C_{1-10}$heteroarylene; and $R^1$ is selected from:

—$R^a$,
—$OR^a$, —$ON(R^a)_2$, —$OC(=O)R^a$, —$C(=O)OR^a$, —$OC(=O)OR^a$, —$SC(=O)R^a$, —$C(=O)SR^a$, —$SC(=O)SR^a$,
—$OC(=O)SR^a$, —$SC(=O)OR^a$,
—$N(R^a)_2$, —$NR^a(OR^a)$, —$NR^aC(=O)R^a$, —$C(=O)N(R^a)_2$, —$NR^aC(=O)OR^a$, —$OC(=O)N(R^a)_2$, —$NR^aC(=O)N(R^a)_2$,
—$SR^a$, $SO_2R^a$, $SO_3R^a$, —$C(=S)R^a$, —$OC(=S)R^a$, —$C(=S)OR^a$, —$C(=S)SR^a$, —$SC(=S)R^a$, —$OC(=S)OR^a$,
—$SC(=S)OR^a$, —$OC(=S)SR^a$,
—$B(R^a)_2$, —$B(OR^a)_2$,
—$Si(R^a)_3$, —$Si(OR^a)_3$,
—$P(R^a)_2$, —$P(=O)(R^a)_2$, —$P(=O)(OR^a)_2$, wherein $R^a$ is in each case independently selected from H, optionally substituted $C_{1-10}$alkyl, $C_{6-18}$aryl, $C_{3-10}$cycloalkyl, $C_{1-10}$heterocycloalkyl, and $C_{1-10}$heteroaryl.

In some embodiments, R can in each case be H. In other embodiments, $X^1$ is null or an alkylene group having the formula:

wherein $R^m$ is H or CH$_3$, wavy line 1 represents the point of attachment to the polymer backbone, and wavy line 2 represents the point of attachment to $R^1$.

Exemplary $R^1$ groups include —SC(=S)$R^a$, —ON($R^a$)$_2$, —B(O$R^a$)$_2$, —P(=O)(O$R^a$)$_2$, —C(=O)$R^a$, and —C(=O)O$R^a$.

In some embodiments, $R^a$ has the formula:

wherein $R^{p1}$ is selected from H, F, Cl, Br, I, C(=O)$R^b$, C(=O)O$R^b$, wherein $R^{p2}$ is selected from H, F, Cl, Br, I, C(=O)$R^b$, C(=O)O$R^b$, wherein $R^{p2}$ is selected from H, F, Cl, Br, I, C(=O)$R^b$, C(=O)O$R^b$, wherein $R^{p2}$ is selected from H, F, Cl, Br, I, C(=O)$R^b$, C(=O)O$R^b$, wherein $R^{p2}$ is selected from H, F, Cl, Br, I, C(=O)$R^b$, C(=O)O$R^b$, wherein $R^b$ is in each case independently selected from H, optionally substituted C$_{1-10}$alkyl, C$_{6-18}$aryl, C$_{3-10}$cycloalkyl, C$_{1-10}$heterocycloalkyl, or C$_{1-10}$heteroaryl.

In some embodiments, $R^b$ has the formula:

wherein n is from 1-10, $X^c$ is null or O, and $R^c$ is C$_{1-10}$alkyl, C$_{6-18}$aryl, C$_{3-10}$cycloalkyl, C$_{1-10}$heterocycloalkyl, or C$_{1-10}$heteroaryl.

The modified polyvinyl chlorides may be prepared by electrolyzing a reaction mixture comprising a transition metal, a polyvinyl chloride polymer, and a radical trap. Without being bound by a particular theory, it is believed that the reaction conditions disclosed herein abstract Cl atoms from a polyvinyl chloride, and the resulting radical or ionic intermediate then covalently bonds with the radical trap. Reaction mixtures may be electrolyzed by supplying an electric current to an electrode, wherein the electrode is in contact with the reaction mixture.

Suitable electrodes include those having one or more Ni, Pt, Zn, or Fe metal. In some embodiments the electrode also serves as the source of the transition metal. The electrode may also be a carbon-based electrodes like reticulated vitreous carbon, carbon paper, carbon felt, graphite, etc. The carbon-based electrode may also include one or more of the aforementioned metals. Suitable currents include those from 0.1-100 mA, from 0.1-50 mA, 0.1-100 mA, from 0.5-50 mA, 0.5-25 mA, from 0.5-15 mA, 0.5-10 mA, from 1-10 mA, 2-10 mA, or from 0.2-8 mA.

Suitable radical traps include Michael acceptors, boron compounds, phosphite compounds, silicon compounds, as well as aryl and vinyl electrophiles like aryl halides and vinyl halides. In other embodiments, the radical trap is proton or an H-transfer agent. Suitable proton sources include acids (of which carboxylic acids and mineral acids may be mentioned), protic solvents (of which water and C$_{1-4}$alcohol may be mentioned). The term "solvent" as used herein is not limited to a functional definition (i.e., it need not be present in amounts typical when the solvent is used as a reaction medium), when a "solvent" is acting as a radical trap, it may be provide in similar molar ratios to the radicals generated. In other embodiments, the "solvent" can be used as the bulk reaction medium for the reduction. In certain embodiments, the radical trap can be hydrogen gas, and in other embodiments the radical trap can be a hydrogen donor such as 1,4-dicyclohexene.

In some embodiments, the electrolysis reaction can be conducted in the presence of a catalyst, which may be a transition metal-ligand complex. In addition to the metals mentioned above in conjunction with the electrode the transition metal may also be Co or Mn. In certain preferred embodiments, the transition metal is Co, Mn, or Fe.

The ligand can be a compound having the formula:

wherein $L^1$ is absent, a bond, NR$^{LE}$, O, S, C$_{1-8}$alkyl, C$_{2-8}$alkenyl, C$_{2-8}$alkynyl, aryl, C$_{1-8}$heteroaryl, C$_{3-8}$cycloalkyl, or C$_{1-8}$heterocyclyl;

$R^{LA}$, $R^{LB}$, $R^{LC}$, $R^{LD}$, and $R^{LE}$ are independently selected from R, OR, N(R)$_2$, PR$_3$, SiR$_3$, SR, SO$_2$R, SO$_2$N(R)$_2$, C(O)R; C(O)OR, OCOR; C(O)N(R)$_2$, OC(O)N(R)$_2$, N(R)C(O)N(R)$_2$, F, Cl, Br, I, cyano, and nitro, wherein R is in each case independently selected from hydrogen, C$_{1-8}$alkyl, C$_{2-8}$alkenyl, C$_{2-8}$alkynyl, aryl, C$_{1-8}$heteroaryl, C$_{3-8}$cycloalkyl, or C$_{1-8}$heterocyclyl; and any two or more of $R^{LA}$, $R^{LB}$, $R^{LC}$, $R^{LD}$, $R^{LE}$, and R may together form a ring; provided that when L1 is absent then at least one of $R^{LA}$ or $R^{LD}$ forms a ring with at least one of $R^{LB}$ or $R^{LC}$ In some embodiments, $L^1$ is absent; and $R^{LC}$ and $R^{LD}$ are together form an aryl, C$_{1-8}$alkyl, C$_{1-8}$heteroaryl, C$_{3-8}$cycloalkyl, or C$_{1-8}$heterocyclyl. For example, $R^{LC}$ and $R^{LD}$ together form a cyclohexyl ring, having the structure:

In such embodiments, $R^{LA}$ and $R^{LB}$ can each include at least one Lewis basic atom, for example any oxygen or nitrogen atom. In some embodiments, $R^{LA}$ and $R^{LB}$ are both 2-hydroxyphenyl.

In certain embodiments, the ligand has the formula:

In other examples, $L^1$ is a bond, NH, $C_{1-8}$heteroaryl or $C_{1-8}$heterocyclyl.

In some examples, $R^{LA}$ and $R^{LB}$ together form a five or six membered ring, for example a pyridinyl ring, an oxazolinyl ring, imidazoyl ring,

In some embodiments, $L^1$ is $C_{1-8}$heteroaryl, for example:

In some embodiments, $L^1$ is $N^{LE}$. In such cases, $R^{LA}$ and $R^{LB}$ can together form a $C_{1-8}$heterocyclyl, e.g., a compound having the structure:

Exemplary ligands include those having the structure:

wherein $R^{c2}$, $R^{c3}$, $R^{c4}$, $R^{c5}$, $R^{d2}$, $R^{d3}$, $R^{d4}$, and $R^{d5}$ are independently selected from H, halo, $C_{1-4}$alkyl, $C_{1-4}$alkoxy, $C_{1-4}$haloalkyl, $NO_2$, CN, $SiR_3$, SR, $NR_2$, C(O)R, wherein R is in each case independently selected from an alkyl, aryl, cycloalkyl, heterocyclyl, or heteroaryl group.

In certain embodiments, the ligand has the formula:

wherein R is independently selected from halo, $C_{1-4}$alkyl, $C_{1-4}$alkoxy, $C_{1-4}$haloalkyl, $NO_2$, CN, $SiR^*_3$, $SR^*$, $NR^*_2$, or $C(O)R^*$, wherein $R^*$ is in each case independently selected from an alkyl, aryl, cycloalkyl, heterocyclyl, or heteroaryl group.

The molar ratio of metal to ligand can be 10:1 to 1:10, from 5:1 to 1:5, from 5:1 to 1:1, from 2.5:1 to 1:1, from 2:1 to 1:1, from 2:1 to 1:2, from 1:1 to 1:2, from 1:1 to 1:2.5, or from 1:1 to 1:5.

The catalyst can be present in an amount from 0.01-5% by weight, 0.05-5% by weight, 0.1-5% by weight, 0.5-5% by weight, 1-5% by weight, 0.01-2.5% by weight, 0.01-1% by weight, or 0.5-1.5% relative to the total weight of the polyvinyl chloride polymer.

Also disclosed herein are modified polyvinyl chloride block copolymers and vitrimers. In some embodiments these compounds can have the formula:

wherein R is as defined above, n is from 8-100, a'+b' is from 8-100, m is from 1-100, and linker comprises one or more of alkylene, arylene, alkarylene, polyester, polycarbonate, polyalkylene glycol, polyamide, polyurethane, and X can have the formula:

In certain embodiments the linker is a polyalkylene glycol, for example a polyethylene glycol or a polypropylene glycol. The polyalkylene glycol can be composed of 1-200 alkylene glycol monomer units, preferably 1-10, 1-50, 10-50, 25-75, 25-100, 50-100, 50-200, 75-125, 100-200, or 150-200 monomer units.

Also disclosed herein are crosslinked modified polyvinyl chloride polymer networks. Such networks may be produced by carrying out the electrolysis reactions described herein with a compound having more than one radical trap group, as described above, e.g., bis(meth)acrylamides, bis(meth) acrylates, tris(meth)acrylamides, tris(meth)acrylates, and the like. The crosslinking radical trap compound may be added to the polyvinyl chloride in an amount from 0.01-10 wt %, from 0.01-1.0 wt %, from 0.1-10 wt %, from 0.1-1 wt %, from 0.1-5 wt %, from 0.1-2.5 wt %, from 0.5-2.5 wt %, from 1-2.5%, from 2.5-10 wt %, from 2.5-5 wt %, or from 5-10 wt %.

Exemplary crosslinking radical trap compounds include compounds having multiple acrylate groups such as N,N'-methylene bisacrylamide, N,N'-methylene bismethacrylamide, bis (2-methacryloxyethyl) phosphate, 1,4-butanediol diacrylate, 1,4-butanediol dimethacrylate, diethylene glycol diacrylate, diethylene glycol dimethacrylate, glycerol trimethacrylate, triallyl cyanurate, triethylene glycol diacrylate, compounds having multiple vinyl groups such as diethyleneglycol diacrylate, triethyleneglycol diacrylate, tetraethyleneglycol diacrylate, polyethyleneglycol diacrylate, 1,6-hexanediol diacrylate, neopentylglycol diacrylate, tripropyleneglycol diacrylate, polypropyleneglycol diacrylate, 2,2'-bis(4-(acryloxy/diethoxy)phenyl)propane, trimethylolpropane triacrylate, tetramethylolmethane tetraacrylate, ethyleneglycol dimethacrylate, diethyleneglycol dimethacrylate, triethyleneglycol dimethacrylate, tetraethyleneglycol dimethacrylate, polyethyleneglycol dimethacrylate, 1,3-butyleneglycol dimethacrylate, 1,6-hexanediol dimethacrylate, neopentylglycol dimethacrylate, polypropyleneglycol dimethacrylate, 2,2'-bis(4-(methacryloxy/diethoxy)phenyl)propane, 2,2'-bis(4-(methacryloxy/polyethoxy)phenyl)propane, trimethylolpropane trimethacrylate, tetramethylolmethane tetramethacrylate, divinyl benzene, divinyl naphthalene, divinyl ether, combinations thereof, and the like.

EXAMPLES

The following examples are for the purpose of illustration of the invention only and are not intended to limit the scope of the present invention in any manner whatsoever.

In a nitrogen-filled glove-box, a 12 mL screw-cap test tube was charged with dimethylacetamide (3 mL), and a magnetic stirbar. Polyvinyl chloride (94 mg, 1 equiv) was then added while stirring. The test tube was then charged with catalyst (0.075 mmol, 0.05 eq), LiCl (16 mg, 0.375 mmol, 0.25 eq) and radical trap (3.00 mmol, 2.0 eq). A nickel foam cathode and a zinc anode was inserted into the test tube and threaded through a septa cap. The sealed test tube was removed from the glove-box. The reaction mixture was stirred on a magnetic stir plate at room temperature. A reductive, constant current was applied at the Ni cathode (3 mA, 2× grafting density). After electrolysis, the reaction was transferred to a 50 mL centrifuge tube and diluted with 3 mL dimethylacetamide. With stirring, 40 mL methanol was slowly added to the solution, the resulting suspension was then centrifuged (2000 rpm, 3 min), decanted, resuspended in 50 mL methanol and stirred for 5 minutes. This process was repeated 4×. The polymer was then dried under high-vacuum for 4 hours.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:
1. A modified polyvinyl chloride having formula:

wherein R is not a chlorine atom; 'a' is from 5-25,000; and 'b' is from 1-20,000,
wherein at least 50 mol % of the b units occur in pentads having the structure:

, or

-continued

2. The polyvinyl chloride according to claim 1, wherein the polymer comprises units having the formula:

in an amount from 0-5%.

3. The polyvinyl chloride according to claim 1, wherein the polymer has a number average molecular mass from 5,000-1,000,000.

4. The polyvinyl chloride according to claim 1, wherein less than 50% of the b units occur in pentads having the structure:

5. The polyvinyl chloride according to claim 1, wherein the polymer comprises repeating pentads having the structure:

6. The polyvinyl chloride according to claim 1, wherein R is in each case independently selected from H, F, Br, I, $NO_2$, CN, and $N_3$.

7. The polyvinyl chloride according to claim 1, wherein R is a group having the formula:

wherein $X^1$ is null, $C_{1-8}$alkylene, $C_{6-18}$arylene, $C_{3-10}$cycloalkylene, $C_{1-10}$heterocycloalkylene, $C_{1-10}$heteroarylene; and
$R^1$ is selected from:
—$R^a$, —$OR^a$, —$ON(R^a)_2$, —$OC(=O)R^a$, —$C(=O)OR^a$, —$OC(=O)OR^a$, —$SC(=O)R^a$, —$C(=O)SR^a$, —$SC(=O)SR^a$, —$OC(=O)SR^a$, —$SC(=O)OR^a$, —$N(R^a)_2$, —$NR^a(OR^a)$, —$NR^aC(=O)R^a$, —$C(=O)N(R^a)_2$, —$NR^aC(=O)OR^a$, —$OC(=O)N(R^a)_2$, —$NR^aC(=O)N(R^a)_2$, —$SR^a$, $SO_2R^a$, $SO_3R^a$, —$C(=S)R^a$, —$OC(=S)R^a$, —$C(=S)OR^a$, —$C(=S)SR^a$, —$SC(=S)R^a$, —$OC(=S)OR^a$, —$SC(=S)OR^a$, —$OC(=S)SR^a$, —$B(R^a)_2$, —$B(OR^a)_2$, —$Si(R^a)_3$, —$Si(OR^a)_3$, —$P(R^a)_2$, —$P(=O)(R^a)_2$, —$P(=O)(R^a)(OR^a)$, —$P(=O)(OR^a)_2$, wherein $R^a$ is in each case independently selected from H, optionally substituted $C_{1-10}$alkyl, $C_{6-18}$aryl, $C_{3-10}$cycloalkyl, $C_{1-10}$heterocycloalkyl, and $C_{1-10}$heteroaryl.

8. The polyvinyl chloride according to claim 1, wherein R is in each case H.

9. The polyvinyl chloride according to claim 1, wherein $X^1$ is null or an alkylene group having the formula:

wherein $R^m$ is H or $CH_3$, wavy line 1 represents the point of attachment to the polymer backbone, and wavy line 2 represents the point of attachment to $R^1$.

10. The polyvinyl chloride according to claim 7, wherein $R^1$ is selected from —$SC(=S)R^a$, —$ON(R^a)_2$, —$B(OR^a)_2$, —$P(=O)(OR^a)_2$, —$C(=O)R^a$, or —$C(=O)OR^a$.

11. The polyvinyl chloride according to claim 10, wherein $R^a$ has the formula:

wherein $R^{p1}$ is selected from H, F, Cl, Br, I, $C(=O)R^b$, $C(=O)OR^b$,
wherein $R^{p2}$ is selected from H, F, Cl, Br, I, $C(=O)R^b$, $C(=O)OR^b$,
wherein $R^{p2}$ is selected from H, F, Cl, Br, I, $C(=O)R^b$, $C(=O)OR^b$,
wherein $R^{p2}$ is selected from H, F, Cl, Br, I, $C(=O)R^b$, $C(=O)OR^b$,
wherein $R^{p2}$ is selected from H, F, Cl, Br, I, $C(=O)R^b$, $C(=O)OR^b$,
wherein $R^b$ is in each case independently selected from H, optionally substituted $C_{1-10}$alkyl, $C_{6-18}$aryl, $C_{3-10}$cycloalkyl, $C_{1-10}$heterocycloalkyl, or $C_{1-10}$heteroaryl.

12. The polyvinyl chloride according to claim 11, wherein $R^b$ has the formula:

wherein n is from 1-10, $X^c$ is null or O, and $R^c$ is $C_{1-10}$alkyl, $C_{6-18}$aryl, $C_{3-10}$cycloalkyl, $C_{1-10}$heterocycloalkyl, or $C_{1-10}$heteroaryl.

* * * * *

UNITED STATES PATENT AND TRADEMARK OFFICE
CERTIFICATE OF CORRECTION

| | | |
|---|---|---|
| PATENT NO. | : 12,116,427 B2 | Page 1 of 1 |
| APPLICATION NO. | : 17/902091 | |
| DATED | : October 15, 2024 | |
| INVENTOR(S) | : Christo Sevov and Blaise Truesdell | |

It is certified that error appears in the above-identified patent and that said Letters Patent is hereby corrected as shown below:

On the Title Page

The title, item (54), and in the Specification, Column 1, Lines 1-2 reading:
MODIFIED POLYVINYLCHLORIDES AND CHLOROPARRAFINS Should read:
MODIFIED POLYVINYLCHLORIDES AND CHLOROPARAFFINS Signed and Sealed this
Eleventh Day of February, 2025

Coke Morgan Stewart
*Acting Director of the United States Patent and Trademark Office*